(12) United States Patent
Appere et al.

(10) Patent No.: US 8,687,329 B2
(45) Date of Patent: Apr. 1, 2014

(54) ANTI-LIGHTNING PROTECTION FOR TELEPHONE CONNECTION

(75) Inventors: Cédric Appere, Saint Cyr sur Loire (FR); André Bremond, Veretz (FR); Christian Ballon, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 189 days.

(21) Appl. No.: 13/153,994

(22) Filed: Jun. 6, 2011

(65) Prior Publication Data

US 2011/0299204 A1    Dec. 8, 2011

(30) Foreign Application Priority Data

Jun. 8, 2010   (FR) .................................... 10 54504

(51) Int. Cl.
*H02H 9/00* (2006.01)
*H01C 7/12* (2006.01)
*H02H 1/00* (2006.01)
*H01H 1/04* (2006.01)
*H02H 3/22* (2006.01)
*H02H 9/06* (2006.01)

(52) U.S. Cl.
USPC ............................................ 361/56; 361/119

(58) Field of Classification Search
USPC .................................................. 361/56, 119
See application file for complete search history.

(56) References Cited

U.S. PATENT DOCUMENTS

| | | | | |
|---|---|---|---|---|
| 5,493,469 A | * | 2/1996 | Lace | 361/119 |
| 6,172,864 B1 | * | 1/2001 | Bremond et al. | 361/119 |
| 6,882,514 B2 | * | 4/2005 | Mutunga et al. | 361/119 |
| 7,019,953 B2 | * | 3/2006 | Caldera et al. | 361/56 |
| 7,746,618 B2 | * | 6/2010 | Bremond et al. | 361/119 |
| 2004/0233691 A1 | | 11/2004 | Caldera et al. | |

FOREIGN PATENT DOCUMENTS

WO       WO 03/026093 A1    3/2003

OTHER PUBLICATIONS

French Search Report dated Nov. 15, 2010 from corresponding French Application 10/54504.

* cited by examiner

*Primary Examiner* — Stephen W Jackson
*Assistant Examiner* — Rasem Mourad
(74) *Attorney, Agent, or Firm* — William R. McClellan

(57) ABSTRACT

A structure for protecting a circuit connected to first and second rails of a telephone connection against overvoltages, including: first and second diodes in anti-series between the first and second rails; a first capacitor in parallel with a first resistor between a first node common to the first and second diodes and a low voltage reference node; and a protection element capable of removing fast overvoltages between any of the rails and the low reference voltage node when these overvoltages exceed a first threshold associated with the voltage of the first node.

18 Claims, 3 Drawing Sheets

001
ANTI-LIGHTNING PROTECTION FOR TELEPHONE CONNECTION

CROSS REFERENCE TO RELATED APPLICATIONS

This application claims the priority benefit of French patent application number 10/54504, filed on Jun. 8, 2010, entitled "ANTI-LIGHTNING PROTECTION FOR TELEPHONE CONNECTION," which is hereby incorporated by reference to the maximum extent allowable by law.

BACKGROUND OF THE INVENTION

1. Field of the Invention

The present invention relates to a structure for protecting an electronic circuit connected to a telephone connection line against fast overvoltages, for example due to lightning.

2. Discussion of the Related Art

FIG. 1 schematically shows an electronic circuit 1 connected to rails 3 and 5 of a telephone connection 7. Circuit 1 is capable of transmitting and/or of receiving signals, respectively $V_{TIP}$ and $V_{RING}$, over rails 3 and 5. Signals $V_{TIP}$ and $V_{RING}$ for example are speech signals, ringing signals, etc. Circuit 1 is further connected to a power supply terminal 9 of high voltage $V_H$ and to a power supply terminal 11 of low voltage $V_L$. Circuit 1 for example is a SLIC-type circuit ("Subscriber Line Interface Circuit"), capable of behaving as an interface between an analog telephone connection line and digital telephone network equipment.

Short and abrupt overvoltages, for example due to lightning, may occur on rails 3 and/or 5. Such overvoltages are capable of damaging components of circuit 1. It is thus generally provided to connect to telephone line 7, between rails 3 and 5, a protection structure 13, capable of rapidly draining off significant currents that may appear when an overvoltage occurs on rail 3 and/or on rail 5.

In an example, structure 13 comprises thyristors 15, 17, 19, and 21, respectively forward-connected between the ground and rail 3, between rail 3 and the ground, between the ground and rail 5, and between rail 5 and the ground. Structure 13 further comprises zener diodes 23, 25, 27, and 29, respectively forward-connected between a cathode gate of thyristor 15 and the ground, between the ground and an anode gate of thyristor 17, between a cathode gate of thyristor 19 and the ground, and between the ground and an anode gate of thyristor 21.

It should be noted that term "ground" here designates a reference potential common to all the device elements, for example, a potential close to 0 V. In practice, structure 13 may be grounded via a ground terminal of circuit 1, or via a ground rail (not shown) comprised in connection 7. In the following description, "positive potential" and "negative potential" will be used to designate potentials respectively greater than the ground potential and smaller than the ground potential, and each time digital potential values will be given as an example, these values will be considered to refer to a ground potential equal to 0 V.

In case of a positive overvoltage on rail 3, thyristor 17, which is forward biased, is capable of being turned on. If the overvoltage exceeds a given threshold, zener diode 25 turns on by avalanche effect. A current then flows between rail 3 and the ground, through the PN junction between the anode and the anode gate of thyristor 17, and through zener diode 25. Thyristor 17 is thus turned on and the overvoltage is removed towards the ground.

In case of a negative overvoltage on rail 3, thyristor 15 is capable of being turned on. If the overvoltage exceeds a given threshold, zener diode 23 turns on by avalanche effect for the negative overvoltage. A negative current then flows between rail 3 and the ground, through the PN junction between the cathode gate and the cathode of thyristor 15. Thyristor 15 is thus turned on and the overvoltage is removed towards the ground.

In case of a positive or negative overvoltage on rail 5, a similar removal scheme applies through thyristors 21 or 19 and zener diodes 29 or 27. Thus, structure 13 enables to remove any overvoltage that may occur on rails 3 and 5.

The turn-on threshold for a positive overvoltage is thus equal to the avalanche voltage of a zener diode (25 or 29) plus the forward voltage drop of a PN junction (on the order of 0.6 V). The turn-on threshold for a negative overvoltage is equal to the opposite of the avalanche voltage of a zener diode (23 or 27) minus the forward voltage drop of a PN junction.

A disadvantage of this type of structure is that the avalanche voltages of the zener diodes should be adapted to the maximum and minimum values that may be taken by signals $V_{TIP}$ and $V_{RING}$ in a normal operation of the device. This actually results in selecting avalanche voltages much greater than the normal excursions of signals $V_{TIP}$ and $V_{RING}$ with respect to the ground, to take into account the component dispersion.

FIG. 2 is an electric diagram corresponding to the diagram of FIG. 1, where protection structure 13 with fixed turn-on thresholds has been replaced with a protection structure 31 having its turn-on thresholds associated with the power supply voltages of circuit 1. Structure 31 is connected not only to rails 3 and 5, but also to power supply terminals 9 and 11 of circuit 1 to be protected. It comprises thyristors 15, 17, 19, and 21, connected as in FIG. 1. Structure 31 further comprises an NPN transistor 33, a PNP transistor 35, an NPN transistor 37, and a PNP transistor 39. The emitters of transistors 33, 35, 37, and 39 are respectively connected to the cathode gate of thyristor 15, to the anode gate of thyristor 17, to the cathode gate of thyristor 19, and to the anode gate of thyristor 21. The collectors of these transistors are all grounded. The bases of transistors 33 and 37 are connected to low power supply terminal 11 ($V_L$), and the bases of transistors 35 and 39 are connected to high power supply terminal 9 ($V_H$).

In case of a positive overvoltage on rail 3, thyristor 17, which is forward biased, is capable of being turned on. The overvoltage is transferred by the PN junction between the anode and the anode gate of thyristor 17 onto the emitter of transistor 35. If the overvoltage exceeds a given threshold, the voltage of the emitter of transistor 35 exceeds the base voltage of this transistor (that is, $V_H$), which turns on. A current then flows between rail 3 and the ground, from the anode to the anode gate of thyristor 17, and through transistor 35. Thyristor 17 is thus turned on and the overvoltage is removed towards the ground.

The other overvoltage polarities are similarly removed by one of the other thyristors, noting that negative overvoltages are referenced to a threshold associated with low power supply voltage $V_L$.

The turn-on threshold for a positive overvoltage is thus equal to high power supply voltage $V_H$ plus twice the forward voltage drop of a PN junction (on the order of 1.2 V). The turn-on threshold for a negative overvoltage is equal to low power supply voltage $V_L$ minus twice the forward voltage drop of a PN junction.

This type of structure is used when the power supply voltages $V_H$ and $V_L$ of the circuit to be protected, present on terminals of the circuit, correspond to the maximum and minimum values that may be taken, in normal operation, by signals $V_{TIP}$ and $V_{RING}$. This type of structure is also used when the circuit to be protected comprises reference terminals between which a reference voltage corresponding to the voltage level of the signals present on the line is established. However, structure 31 has the disadvantage of disturbing the voltages of the reference terminals to which it is connected.

In certain cases, the circuit to be protected receives on its access terminals a power supply voltage of much lower level than the voltage level of signals $V_{TIP}$ and $V_{RING}$. The circuit to be protected then comprises converters for providing voltage levels adapted to the telephone line, and these voltage levels are not accessible from access terminals of the circuit.

SUMMARY OF THE INVENTION

Thus, an embodiment of the present invention is to provide a structure for protecting a circuit connected to a telephone line, which overcomes at least some of the disadvantages of existing solutions.

An embodiment of the present invention is to provide a self-adaptive protection structure, that is, a structure having turn-on thresholds which automatically adapt to the voltage level of the signals which run through the telephone line in a given operation mode.

An embodiment of the present invention is to provide such a structure which requires no previous knowledge of the voltage levels of the signals conducted by the telephone line.

An embodiment of the present invention is to provide such a structure which does not require to be connected to reference terminals defining the voltage level of the signals conducted by the telephone line.

Thus, an embodiment provides a structure for protecting a circuit connected to first and second rails of a telephone connection against overvoltages, comprising: first and second diodes in anti-series between the first and second rails; a first capacitor in parallel with a first resistor between a first node common to the first and second diodes and a low voltage reference node; and a protection element capable of removing fast overvoltages between any of the rails and the low reference voltage node when these overvoltages exceed a first threshold associated with the voltage of the first node.

According to an embodiment, the first threshold is a low threshold lower than the low reference voltage.

According to an embodiment, the protection structure further comprises: third and fourth diodes in anti-series between the first and second rails, the first and fourth diodes being series-connected, and the second and third diodes being series-connected; and a second capacitor in parallel with a second resistor between a second node common to the third and fourth diodes and said low voltage node, wherein the protection element is capable of removing fast overvoltages between any of the rails and the low voltage node when such overvoltages exceed a second threshold associated with the voltage of the second node.

According to an embodiment, the second threshold is a high threshold, higher than the low reference voltage.

According to an embodiment, the protection element comprises: first to fourth thyristors forward-connected, respectively, between the low voltage node and the first rail, between the first rail and the low voltage node, between the low voltage node and the second rail, and between the second rail and the low voltage node; and first and second NPN transistors, and first and second PNP transistors, having their emitters respectively connected to a cathode gate of the first thyristor, to a cathode gate of the third thyristor, to an anode gate of the second thyristor, and to an anode gate of the fourth thyristor, and having their collectors connected to the low voltage node, the bases of the PNP transistors being connected to the second common node, and the bases of the NPN transistors being connected to the first common node.

According to an embodiment, the protection element comprises: first and second thyristors forward-connected, respectively, between the low voltage node and the first rail, and between the low voltage node and the second rail; first and second NPN transistors having their emitters respectively connected to a cathode gate of the first thyristor and to a cathode gate of the second thyristor, having their collectors connected to the low voltage node, and having their bases connected to the first common node; and third and fourth diodes forward-connected, respectively, between the first rail and the low voltage node and between the second rail and the low voltage node.

According to an embodiment, the first capacitor has a capacitance ranging between 100 and 300 nF, and the first resistance ranges between 3 and 6 MΩ.

Another embodiment provides a subscriber line interface circuit associated with a protection structure of the above-mentioned type.

Another embodiment provides a method for protecting an integrated circuit connected to first and second rails of a telephone line against overvoltages, comprising the steps of: storing, in an initialization phase, the maximum or minimum voltage level of the signals applied to the first and second rails; and triggering a protection element connected between the first and second rails and to a low reference voltage node, when a fast overvoltage exceeding a threshold associated with said maximum or minimum level occurs between any of the rails and the low reference voltage node.

The foregoing and other objects, features, and advantages of the present invention will be discussed in detail in the following non-limiting description of specific embodiments in connection with the accompanying drawings.

DETAILED DESCRIPTION

Figure 1:
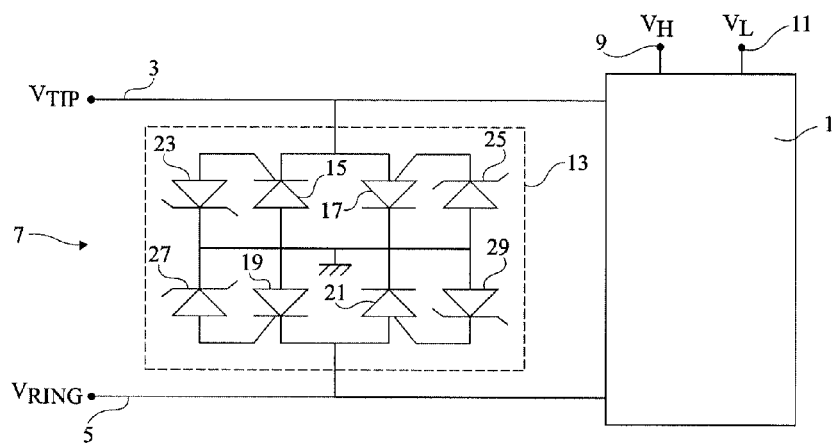
FIG. 1, previously-described, schematically shows a device comprising a circuit connected to rails of a telephone line, and a structure for protecting this circuit against overvoltages.

For clarity, the same elements have been designated with the same reference numerals in the different drawings.

In a telephone network, several operating modes are possible, where signals $V_{TIP}$ and $V_{RING}$ conducted by rails 3 and 5 of telephone line 7 (FIGS. 1 and 2) are at very different voltage levels.

Figure 3A:
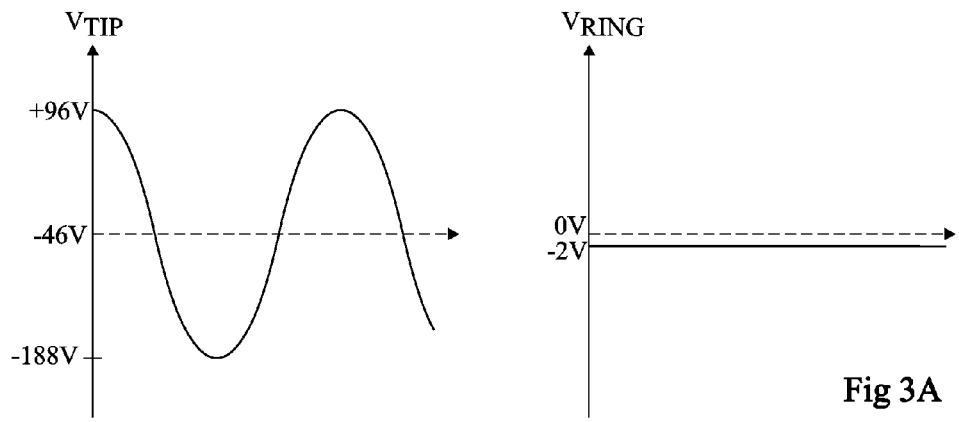
FIGS. 3A to 3C are timing diagrams schematically illustrating examples of the variation of signals conducted by the rails of a telephone line in normal operation.
Figure 3B:
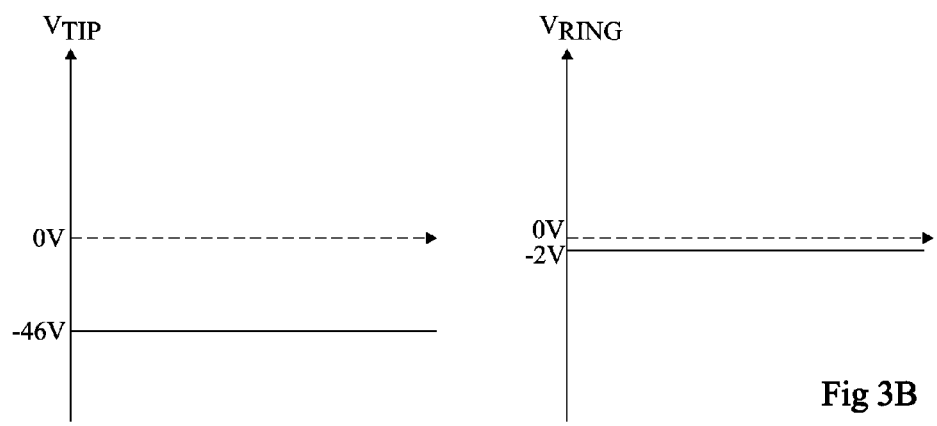
Figure 3C:
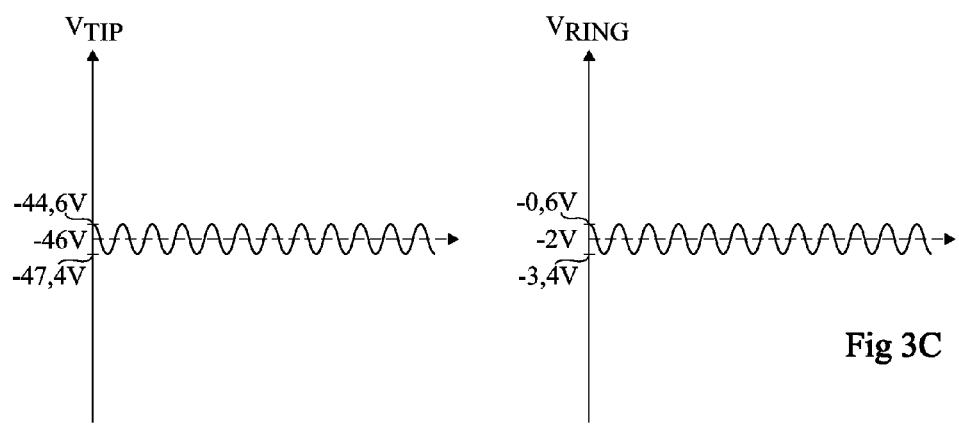

FIGS. 3A to 3C are timing diagrams schematically illustrating examples of the variation of signals $V_{TIP}$ and $V_{RING}$ during the normal operation of the telephone network.

FIG. 3A corresponds to an operating mode where line 7 conducts a ringing signal addressed to a subscriber of the network. It will be spoken hereafter of a "ringing mode". In this case, signal $V_{TIP}$ is a sinusoidal signal having a 284-V peak-to-peak amplitude, centered on −46 V, of 50-Hz frequency. Signal $V_{RING}$ is a D.C. −2-V signal.

FIG. 3B corresponds to the case where line 7 is idle, that is, no communication is completed or about to be completed. It will be spoken hereafter of a "stand-by mode". In this case, signals $V_{TIP}$ and $V_{RING}$ are D.C. signals, respectively of −46 V and −2 V.

FIG. 3C corresponds to an operating mode in which line 7 conducts a speech signal. It will be spoken hereafter of a "speech mode". In this case, signal $V_{TIP}$ is a modulated sound signal having a 2.8-V peak-to-peak amplitude, centered on −46 V. Signal $V_{RING}$ also is a signal with a peak-to-peak amplitude equal to 2.8 V, but centered on −2 V.

Other operating modes, not shown, may also be encountered, where signals $V_{TIP}$ and $V_{RING}$ take different shapes and/or voltage levels.

Figure 4:
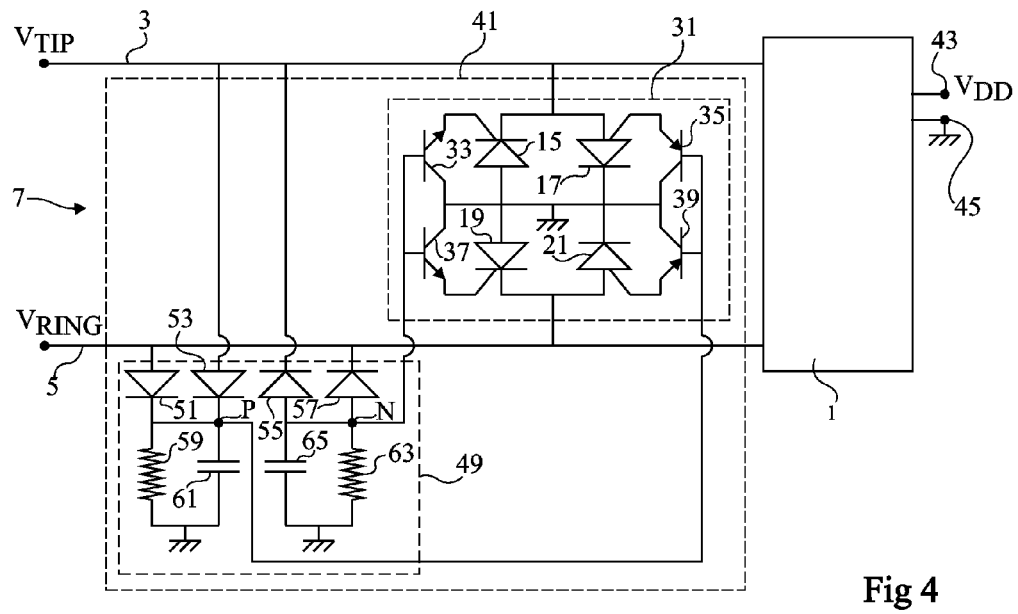
FIG. 4 schematically shows an embodiment of a self-adaptive structure for protecting a circuit connected to rails of a telephone line.

FIG. 4 schematically shows an embodiment of a self-adaptive structure 41 for protecting a circuit 1 connected to rails 3 and 5 of a telephone line 7 against overvoltages. Circuit 1 is for example capable of transmitting and/or of receiving, over rails 3 and 5, signals $V_{TIP}$ and $V_{RING}$ of the type described in relation with FIGS. 3A to 3C. In this example, circuit 1 is connected to power supply terminals 43 of high voltage $V_{DD}$ and 45 of low voltage (here, the ground). Voltage $V_{DD}$ for example approximately is 5 V.

Figure 2:
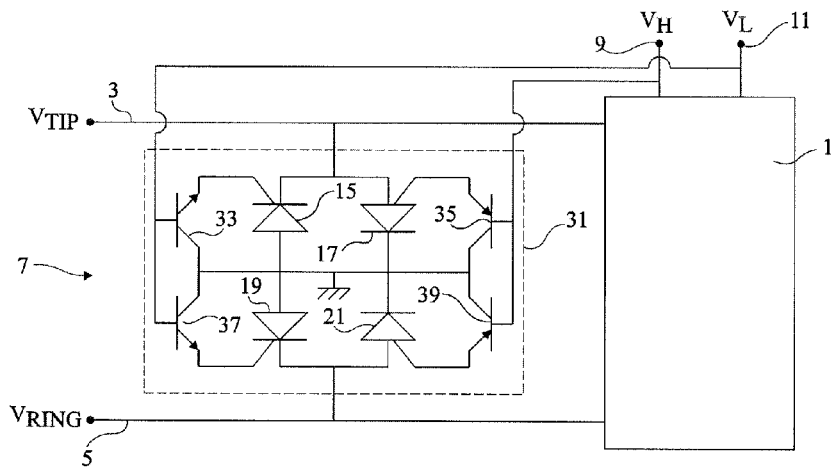
FIG. 2, previously described, schematically shows another example of a structure for protecting a circuit connected to rails of a telephone line against overvoltages.

Structure 41 comprises a protection element 31 similar to that described in relation with FIG. 2. This protection element is connected between rails 3 and 5, as in FIG. 2. The bases of transistors 33 and 37 of element 31 are connected to a node N, and the bases of transistors 35 and 39 of element 31 are connected to a node P. Protection element 31 is capable of rapidly draining off significant currents when a positive overvoltage, having a level greater than a threshold associated with the voltage at node P, or a negative overvoltage, having a level smaller than a threshold associated with the voltage at node N, occurs on rail 3 or on rail 5.

The turn-on threshold for a positive overvoltage is thus equal to the voltage at node P plus twice the forward voltage drop of a PN junction (on the order of 1.2 V). The turn-on threshold for a negative overvoltage is equal to the voltage at node N minus twice the forward voltage drop of a PN junction.

Protection structure 41 further comprises an element 49 capable of storing the voltage level of signals $V_{TIP}$ and $V_{RING}$ conducted by rails 3 and 5, during a normal operation of the network.

Storage element 49 comprises diodes 51, 53, 55, and 57 forward-connected, respectively, between rail 5 and node P, between rail 3 and node P, between node N and rail 3, and between node N and rail 5. Element 49 further comprises a resistor 59 in parallel with a capacitor 61, between node P and the ground, and a resistor 63 in parallel with a capacitor 65, between node N and the ground.

When protection structure 41 is not connected, or when rails 3 and 5 are left floating, capacitors 61 and 65 are discharged. Thus, at a time t0 when the network portion comprising circuit 1, rails 3 and 5, and structure 41, is started up, the voltages at nodes N and P are substantially equal to the ground voltage.

Diodes 51 and 53 are conductive for positive signals $V_{RING}$ and $V_{TIP}$ having a level greater than their forward voltage drop $V_F$ (on the order of 0.6 V), and non-conductive for signals having a level lower than $V_F$.

Diodes 55 and 57 are conductive for negative signals $V_{TIP}$ and $V_{RING}$ having a level smaller than −$V_F$ and non-conductive for signals having a level greater than −$V_F$.

If at least one of signals $V_{TIP}$ and $V_{RING}$ reaches a positive level greater than $V_F$, capacitor 61 progressively charges to a value $V_{MAX}$−$V_F$, $V_{MAX}$ being the maximum level reached by the most positive of signals $V_{TIP}$ and $V_{RING}$. Thus, after an initialization time, the voltage at node P settles to $V_{MAX}$−$V_F$.

However, if signals $V_{TIP}$ and $V_{RING}$ both remain lower than $V_F$, the voltage at node P is maintained equal to the ground voltage.

If at least one of signals $V_{TIP}$ and $V_{RING}$ reaches a negative level lower than −$V_F$, capacitor 65 progressively charges to a value $V_{MIN}$+$V_F$, $V_{MIN}$ being the minimum level reached by the most negative of signals $V_{TIP}$ and $V_{RING}$. Thus, after an initialization time, the voltage at node N settles to $V_{MIN}$+$V_F$.

However, if signals $V_{TIP}$ and $V_{RING}$ both remain greater than −$V_F$, the voltage at node N is maintained equal to the ground voltage.

As an example, when the device is in ringing mode (see FIG. 3A), after an initialization period, the voltage at node P settles to $V_{MAX}$−$V_F$, and the voltage at node N settles to $V_{MIN}$+$V_F$. The high and low turn-on thresholds of protection structure 41 in case of an abrupt overvoltage thus respectively settle to:

$$V_{MAX}-V_F+2V_F=V_{MAX}+V_F (=96.6 \text{ V in this example}),$$
$$\text{and } V_{MIN}+V_F-2V_F=V_{MIN}-V_F (=-188.6 \text{ V in this example}).$$

When the device is in stand-by mode (see FIG. 3B), after an initialization period, the high and low turn-on thresholds of protection structure 41 in case of an abrupt overvoltage respectively settle to:

$$V_{GND}+2V_F, \text{ where } V_{GND} \text{ is the ground voltage, and}$$
$$V_{MIN}+V_F-2V_F=V_{MIN}-V_F,$$

that is, 1.2 V et −46.6 V in this example.

When the device is in speech mode (see FIG. 3C), after an initialization period, the high and low turn-on thresholds of protection structure 41 in case of an abrupt overvoltage respectively settle to:

$$V_{GND}+2V_F (=1.2 \text{ V in this example}), \text{ and } V_{MIN}+V_F-2V_F=V_{MIN}-V_F (=-47.4 \text{ V}=-0.6 \text{ V}=-48 \text{ V in this example}).$$

The provided protection structure enables to remove any type of abrupt overvoltage, be it positive or negative, capable of occurring on the telephone line.

An advantage of such a structure is that the protection turn-on thresholds automatically adapt, after a short initialization period, to the voltage level of the signals conducted by the line, and this while the protection structure is only connected to rails 3 and 5 of the line and to ground.

This protection structure can thus be used whatever the circuit to be protected, even when the minimum and maximum voltage levels of the signals capable of conducted by the telephone line are not known previously.

The capacitances of capacitors 61 and 65 should be selected to be low enough to enable a fast charge on starting up of the device or in a change of operating mode. Further, capacitor 61 and resistor 59, on the one hand, and capacitor 65 and resistor 63, on the other hand, should define sufficiently high products R*C to result in a relatively slow discharge of the capacitors. In particular, in ringing mode, capacitors 61 and 65 should not significantly discharge between two peaks of the 50 Hz sinusoidal signal. The present inventors have determined that capacitors having a capacitance ranging between 100 and 300 nF, and capable of withstanding a voltage on the order of 250 V, and resistors from 3 to 6 MΩ, generally are a good compromise. Such values are further compatible with an integration of the capacitors. The present invention is however not limited to these specific values.

Figure 5:
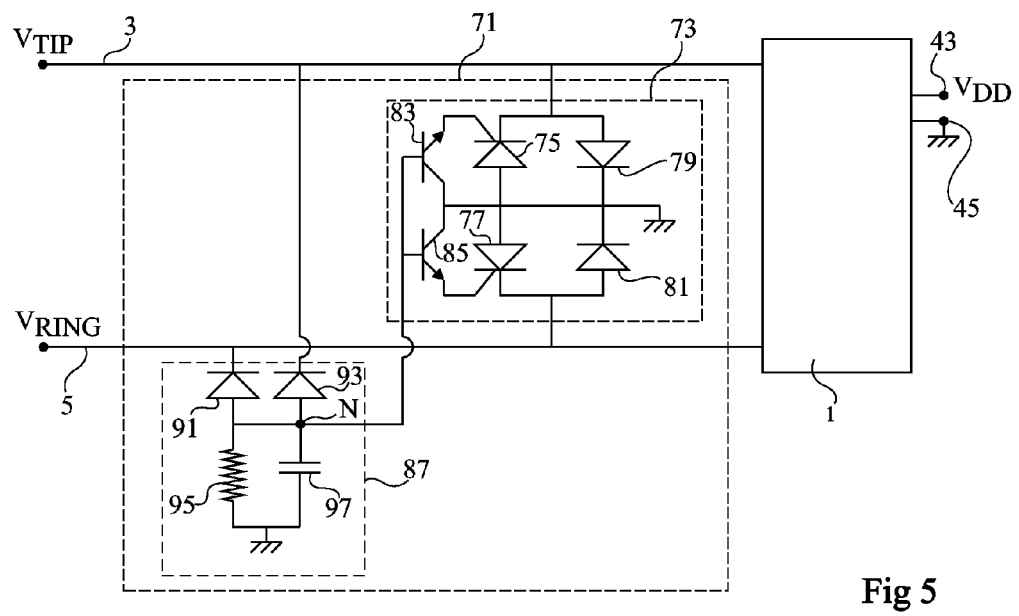
FIG. 5 schematically shows another embodiment of a self-adaptive protection structure, specifically adapted to the case where only negative signals are applied to the telephone line.

FIG. 5 schematically shows a simplified embodiment of a self-adaptive protection structure 71, specifically adapted to the case where the telephone line only conducts negative signals $V_{TIP}$ and $V_{RING}$.

Structure 71 comprises a protection element 73, connected between rails 3 and 5 and to a node N, capable of rapidly draining off significant currents when a positive overvoltage greater than the forward voltage drop of a diode, or a negative overvoltage of lower level than a threshold associated with the voltage at node N, occurs on rail 3 or on rail 5.

In this example, protection element 73 comprises thyristors 75 and 77 forward-connected, respectively, between the ground and rail 3, and between the ground and rail 5, and diodes 79 and 81 forward-connected, respectively, between rail 3 and the ground, and between rail 5 and the ground. Protection element 73 further comprises NPN transistors 83 and 85. The emitters of transistors 83 and 85 are respectively connected to the cathode gate of thyristor 75, and to the cathode gate of thyristor 77. The collectors of these transistors are grounded, and their bases are connected to node N.

The turn-on threshold for a positive overvoltage is equal to forward voltage drop $V_F$ of a diode (79 or 81). The turn-on threshold for a negative overvoltage is equal to the voltage at node N minus twice the forward voltage drop of a PN junction.

Protection structure 71 further comprises an element 87 capable of storing the most negative voltage level of signals $V_{TIP}$ and $V_{RING}$ conducted by rails 3 and 5, during a normal operation of the network.

Storage element 87 comprises diodes 91 and 93 forward-connected, respectively, between node N and rail 5, and between node N and rail 3. Element 87 further comprises a resistor 95 in parallel with a capacitor 97, between node N and the ground.

Thus, at a time t0 when the telephone network portion comprising circuit 1, rails 3 and 5, and structure 71, is started up, capacitor 97 is discharged, and the voltage at node N is substantially equal to the ground voltage.

Capacitor 97 progressively charges to a value $V_{MIN}+V_F$, $V_{MIN}$ being the minimum level reached by the most negative of signals $V_{TIP}$ and $V_{RING}$. Thus, after an initialization time, the high and low turn-on thresholds of protection structure 71 in case of an abrupt overvoltage on rail 3 or on rail 5 respectively settle to $V_F$, and $V_{MIN}+V_F-2V_F=V_{MIN}-V_F$.

Specific embodiments have been described. Various alterations and modifications will occur to those skilled in the art. In particular, structures of protection against overvoltages comprising the following elements have been described herein:

an element for storing the maximum (and/or minimum) voltage level of the signals conducted by a telephone line, and a protection element capable of removing fast overvoltages on the line, when the overvoltages exceed the stored level.

The present invention is not limited to the above-mentioned examples of protection elements. It will be within the abilities of those skilled in the art to implement the desired operation by using other protection elements capable of removing overvoltages when the overvoltages exceed a threshold associated with a reference voltage applied to a terminal of the protection element.

Further, a telephone line protection structure is generally formed of an independent chip, capable of being connected to the telephone line on the side of the circuit to be protected. However, the provided structure may also be integrated to the circuit which is desired to be protected.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A structure for protecting a circuit connected to first and second rails of a telephone connection against overvoltages, comprising:
   first and second diodes in anti-series between the first and second rails;
   a first capacitor in parallel with a first resistor directly connected at one end to a first node common to the first and second diodes and directly connected at the other end to a low reference voltage node; and
   a protection element configured to remove fast overvoltages between any of the rails and the low reference voltage node when the overvoltages exceed a first threshold associated with a voltage of the first node.

2. The protection structure of claim 1, wherein the first threshold is a low threshold lower than the low reference voltage.

3. The protection structure of claim 1, further comprising:
   third and fourth diodes in anti-series between the first and second rails; and
   a second capacitor in parallel with a second resistor directly connected at one end to a second node common to the third and fourth diodes and directly connected at the other end to said low reference voltage node,
   wherein said protection element is configured to remove fast overvoltages between any of the rails and the low reference voltage node when the overvoltages exceed a second threshold associated with a voltage of the second node.

4. The protection structure of claim 3, wherein the second threshold is a high threshold, higher than the low reference voltage.

5. The protection structure of claim 3, wherein said protection element comprises:
   first to fourth thyristors forward-connected, respectively, between the low voltage node and the first rail, between the first rail and the low voltage node, between the low voltage node and the second rail, and between the second rail and the low voltage node; and
   first and second NPN transistors, and first and second PNP transistors, having their emitters respectively connected to a cathode gate of the first thyristor, to a cathode gate of the third thyristor, to an anode gate of the second thyristor, and to an anode gate of the fourth thyristor, and having their collectors connected to the low voltage node, the bases of the PNP transistors being connected to the second common node, and the bases of the transistors NPN being connected to the first common node.

6. The protection structure of claim 1, wherein said protection element comprises:
   first and second thyristors forward-connected, respectively, between the low voltage node and the first rail, and between the low voltage node and the second rail;
   first and second NPN transistors having their emitters respectively connected to a cathode gate of the first thyristor and to a cathode gate of the second thyristor, having their collectors connected to the low voltage node, and having their bases connected to the first common node; and third and fourth diodes forward-connected, respectively, between the first rail and the low voltage node, and between the second rail and the low voltage node.

7. The protection structure of claim 1, wherein the first capacitor has a capacitance ranging between 100 and 300 nF, and wherein the first resistance ranges between 3 and 6 MΩ.

8. A subscriber line interface circuit associated with the protection structure of claim 1.

9. A method for protecting a circuit connected to first and second rails of a telephone line against overvoltages, comprising:

storing, in an initialization phase, a maximum or minimum voltage level of signals applied to the first and second rails during normal operation; and triggering a protection element connected between the first and second rails and to a low reference voltage node, when a fast overvoltage exceeding a threshold associated with said maximum or minimum voltage level occurs between any of the rails and the low reference voltage node, wherein storing at least one voltage level comprises storing a first voltage level based on signals on the first and second rails in a first storage circuit comprising a first diode coupled between the first rail and a first node, a second diode coupled between the second rail and the first node, and a first capacitor in parallel with a first resistor directly connected at a first end to the first node and directly connected at a second end to the low reference voltage node, wherein the first node provides the stored first voltage level.

10. A protection structure to protect a circuit connected to first and second rails against overvoltages, comprising:

a storage element coupled to the first and second rails and configured to store at least one voltage level representative of a signal on the first and second rails; and a protection element coupled to the first and second rails and to a reference node, and configured to remove overvoltages on the first and second rails that exceed at least one threshold based on the at least one stored voltage level, wherein the storage element comprises a first storage circuit configured to store a first voltage level based on signals on the first and second rails during normal operation, wherein the first storage circuit comprises a first diode coupled between the first rail and a first node, a second diode coupled between the second rail and the first node, and a first capacitor in parallel with a first resistor directly connected at a first end to the first node and directly connected at a second end to the reference node, and wherein the first node provides the stored first voltage level.

11. A protection structure as defined in claim 10, wherein the protection element includes first and second thyristors respectively coupled between the first and second rails and the reference node, wherein the first and second thyristors are triggered based on the stored first voltage level on the first node.

12. A protection structure as defined in claim 10, wherein the storage element further includes a second storage circuit configured to store a second voltage level based on signals on the first and second rails during normal operation.

13. A protection structure as defined in claim 12, wherein the second storage circuit includes third and fourth diodes respectively coupled between the first and second rails and a second node, and a second capacitor in parallel with a second resistor directly connected at a first end to the second node and directly connected at a second end to the reference node, wherein the second node provides the stored second voltage level.

14. A protection structure as defined in claim 13, wherein the protection element comprises first and second thyristors respectively coupled between the first and second rails and the reference node and wherein the first and second thyristors are triggered based on the stored first voltage level on the first node, the protection element further comprising third and fourth thyristors respectively coupled between the first and second rails and the reference node, wherein the third and fourth thyristors are triggered based on the stored second voltage level on the second node.

15. A method for protecting a circuit connected to first and second rails against overvoltages, comprising:

storing, in a storage element coupled to the first and second rails, at least one voltage level representative a voltage level of a signal on the first and second rails during normal operation; and removing, by a protection element coupled to the first and second rails and to a reference node, overvoltages on the first and second rails that exceed at least one threshold based on the at least one stored voltage level, wherein storing at least one voltage level comprises storing a first voltage level based on signals on the first and second rails in a first storage circuit comprising a first diode coupled between the first rail and a first node, a second diode coupled between the second rail and the first node, and a first capacitor in parallel with a first resistor directly connected at a first end to the first node and directly connected at a second end to the reference node, wherein the first node provides the stored first voltage level.

16. A method for protecting a circuit as defined in claim 15, wherein removing overvoltages on the first and second rails comprises triggering first and second thyristors based on the stored first voltage level on the first node, wherein the first and second thyristors are respectively coupled between the first and second rails and the reference node.

17. A method for protecting a circuit as defined in claim 15, wherein storing at least one voltage level comprises storing a first voltage level based on signals on the first and second rails in a first storage circuit comprising first and second diodes respectively coupled between the first and second rails and a first node, and a first capacitor in parallel with a first resistor directly connected at a first end to the first node and directly connected at a second end to the reference node, and storing a second voltage level based on signals on the first and second rails in a second storage circuit comprising third and fourth diodes respectively coupled between the first and second rails and a second node, and a second capacitor in parallel with a second resistor directly connected at a first end to the second node and directly connected at a second end to the reference node, wherein the first node provides the stored first voltage level and the second node provides the stored second voltage level.

18. A method for protecting a circuit as defined in claim 17, wherein removing overvoltages on the first and second rails comprises triggering first and second thyristors based on the stored first voltage level on the first node, wherein the first and second thyristors are respectively coupled between the first and second rails and the reference node, and triggering third and fourth thyristors based on the stored second voltage level on the second node, wherein the third and fourth resistors are respectively coupled between the first and second rails and the reference node.

\* \* \* \* \*